United States Patent [19]

Knight

[11] 4,298,830

[45] Nov. 3, 1981

[54] HORIZONTAL DEFLECTION GENERATOR AND DRIVER CIRCUIT

[75] Inventor: Peter R. Knight, Indianapolis, Ind.

[73] Assignee: RCA Corporation, New York, N.Y.

[21] Appl. No.: 98,923

[22] Filed: Nov. 30, 1979

[51] Int. Cl.³ .............................................. H01J 29/70
[52] U.S. Cl. .................................... 315/411; 315/408
[58] Field of Search ................ 315/403, 409, 408, 411

[56] References Cited

U.S. PATENT DOCUMENTS

| | | | |
|---|---|---|---|
| 3,555,343 | 1/1971 | Allen | 315/8 |
| 3,582,721 | 6/1971 | van Hoorn et al. | 317/157.8 |
| 4,112,465 | 9/1978 | Willis | 315/411 X |
| 4,147,964 | 4/1979 | Luz et al. | 315/411 |
| 4,169,241 | 9/1979 | Peer et al. | 315/411 |
| 4,178,536 | 12/1979 | Manners | 315/408 |
| 4,209,731 | 6/1980 | Miko et al. | 315/411 X |

*Primary Examiner*—Malcolm F. Hubler

*Attorney, Agent, or Firm*—Paul J. Rasmussen; William H. Meagher; Joseph Laks

[57] ABSTRACT

A horizontal deflection generator includes the series arrangement of a horizontal deflection winding and a trace capacitor, a retrace capacitor, and a horizontal trace switch. The trace switch comprises a damper diode and a horizontal output transistor. Base drive for the horizontal output transistor is provided by a horizontal driver stage through a driver transformer. A secondary winding of a flyback transformer is coupled to a high impedance cascade rectifier arrangement to form a DC supply which provides collector supply voltage for the driver stage. The DC supply has a relatively large source impedance to changes in the load current being drawn from the supply by the driver stage. Such a large impedance is desirable in order to limit the base driver to the horizontal output transistor during picture tube arc-over and to allow for duty cycle tolerances in the horizontal oscillator output.

6 Claims, 1 Drawing Figure

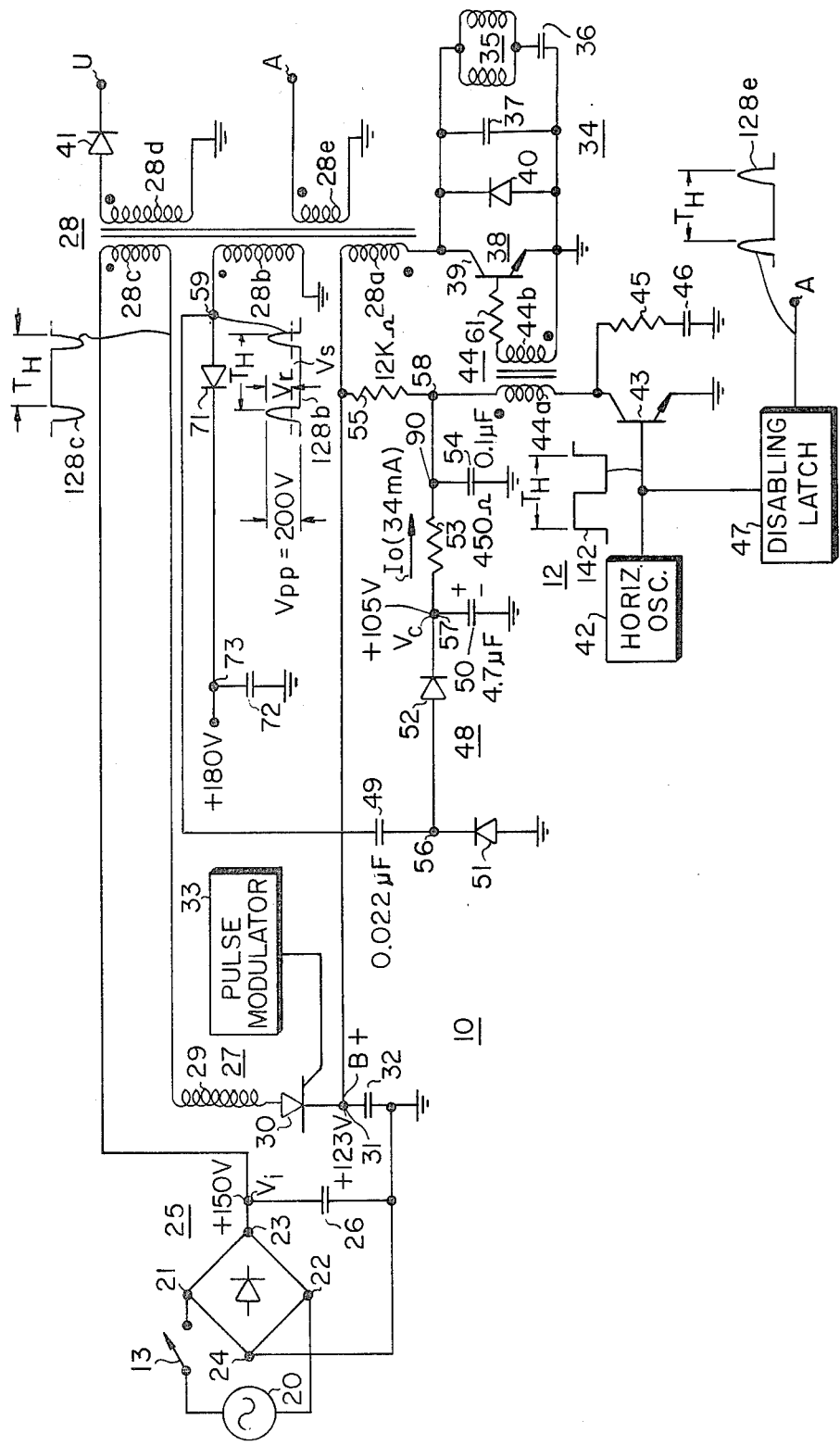

HORIZONTAL DEFLECTION GENERATOR AND DRIVER CIRCUIT

This invention relates to horizontal deflection circuits for television receivers.

In typical television receiver circuits, the ultor accelerating potential or high voltage for a picture tube is typically derived by rectifying a retrace pulse voltage developed in a high voltage winding of a horizontal output or flyback transformer. The retrace pulse voltage is developed by a horizontal deflection generator and then applied to the primary winding of the flyback transformer. The horizontal deflection generator comprises a horizontal deflection winding, retrace capacitor and trace switch comprising a damper diode and a horizontal output transistor. The collector current in the horizontal output transistor includes a load current component flowing from the primary winding of the flyback transformer. This component represents the reflected load currents flowing in the various load circuits coupled to secondary windings of the flyback transformer including the ultor load circuit coupled to the high voltage winding.

During picture tube arc-over, the collector current of the output transistor increases considerably. Damage to the output transistor may result if the collector current is not limited during arc-over. To limit excessive collector currents in the horizontal output transistor, the driver stage for the output transistor may be designed to provide a base drive which is insufficient to support an excessive output transistor collector current. Typically, an RC decoupling arrangement is provided in the direct current supply for the driver stage collector circuit to reduce the direct current supply voltage under increased loading of the driver stage. Such an RC decoupling arrangement dissipates relatively large amounts of power, especially if a large direct current supply voltage is required for the driver stage.

In a power supply regulator circuit where the duty cycle of a switch transistor is being varied, such as in a Wessel-like deflection circuit wherein the horizontal output transistor also functions as the regulator switch, the use of transformer coupled base drive results in variations of the drive amplitude with duty cycle variations. Duty cycle variations tend to place additional stress on the switching or horizontal output transistor. A compromise must the be made when selecting the forward and reverse drive operating conditions.

In a flyback converter type drive arrangement, the driver transistor conducts during the off-time of the switching transistor. The driver transistor average collector current decreases when the on-time of the switching transistor increases. With a stable driver stage supply voltage, the forward base current in the switching transistor would then undesirably decrease.

A feature of the invention is to provide a DC supply for the driver stage of the horizontal output transistor, which supply includes a relatively high source impedance. Thus, any change in average current drawn by the driver stage would result in a compensating change to the driver supply voltage, reducing undesirable changes in the output transistor base current. Such a high impedance DC supply should be designed for low dissipation operation and provide a relatively large DC collector supply voltage with a low AC ripple content.

In an inventive arrangement, a cascade rectifier arrangement is coupled to a flyback transformer winding to provide a DC supply for the collector load circuit of the driver stage. The cascade rectifier arrangement includes a first capacitor in series with the flyback transformer winding and a second capacitor in shunt with the collector load to filter the DC supply.

The FIGURE illustrates a horizontal deflection generator and driver circuit embodying the invention.

In the horizontal deflection generator and driver circuit 10 of the FIGURE, a source of alternating current voltage 20, such as the AC power line or mains supply, is coupled through an ON/OFF switch 13 to input terminals 21 and 22 of a bridge rectifier 25. A filter capacitor 26 is coupled between an output terminal 23 of rectifier 25 and the ground or current return terminal 24. A filtered but unregulated DC input voltage $V_i$, illustratively of +150 volts, is developed at terminal 23.

A switching regulator circuit 27 provides a regulated B+ operating voltage of illustratively +123 volts at a terminal 31, derived from the unregulated input voltage $V_i$. Switching regulator 27 includes the series arrangement of a winding 28c of a horizontal output or flyback transformer 28, an inductor 29, and a silicon controlled rectifier SCR 30, the series arrangement being coupled between terminal 23 and B+ operating terminal 31. A horizontal rate filter capacitor 32 is coupled between terminal 31 and ground.

A conventional pulse modulator circuit 33 applies a gating pulse to SCR 30 at a controlled instant within the trace interval of each horizontal deflection cycle. SCR 30 conducts current from terminal 23 to charge filter capacitor 32. The SCR is commutated off within the horizontal retrace interval of each deflection cycle by application of a negative retrace pulse voltage 128c to inductor 29 and SCR 30.

B+ operating terminal 31 is coupled through a primary winding 28a of flyback transformer 28 to a horizontal deflection winding 35 of a horizontal deflection generator 34. Horizontal deflection generator 34 comprises the series arrangement of horizontal deflection winding 35 and a trace capacitor 36, a retrace capacitor 37, and a trace switch 38 comprising a horizontal output transistor 39 and a damper diode 40. The retrace pulse voltages developed across horizontal deflection winding 35 are applied to primary winding 28a of flyback transformer 28, stepped up by a high voltage secondary winding 28d, rectified by a diode 41 to provide a DC ultor accelerating potential or high voltage at a terminal U for a television receiver picture tube. Other secondary windings of flyback transformer 28, such as a winding 28b, are used to provide auxiliary DC supply voltages to such circuits as the picture tube driver, vertical, video and audio circuits. A +180 volt DC supply is generated at a terminal 73 from the retrace pulse voltage 128b developed across flyback transformer winding 28b after rectification by a diode 71 and filtering by a capacitor 72.

The currents drawn by the load circuits coupled to the various secondary windings of flyback transformer 28 are reflected back as a load current component of primary winding 28a. The reflected load currents form the DC component of the collector current of horizontal output transistor 39.

Horizontal output transistor 39 is switched into and out of conduction each deflection cycle by a base drive signal applied to the output transistor from a horizontal oscillator and driver circuit 12. Horizontal oscillator and driver circuit 12 comprises a conventional horizontal oscillator 42, a driver transistor 43 and a driver transformer 44. The primary winding 44a of driver transformer 44 is coupled to the collector of driver transistor 43, and the secondary winding 44b of driver transformer 44 is coupled to the base of horizontal output transistor 39 through a resistor 61. A damping resistor 45 and capacitor 46 are coupled between the collector of driver transistor 43 and ground. A DC collector supply voltage $V_c$ for driver transistor 43 is developed at an output terminal 57 and coupled to driver transformer primary winding 44a through a resistor 53. A bypass capacitor 54 is coupled to a terminal 58, the junction of resistor 53 and winding 44a.

Horizontal oscillator 42 develops a deflection rate, $1/T_H$, square-wave switching voltage 142 which is applied to the base of driver transistor 43. Driver transistor 43 inverts and amplifies square-wave voltage 142. Driver transformer 44 applies the inverted and amplified square-wave voltage to the base of horizontal output transistor 39 with the windings of the transformer arranged in a flyback converter configuration to provide for nonsimultaneous conduction of driver transistor 43 and horizontal output transistor 39.

Driver transistor 43 is turned on by the positive-going edge of square-wave voltage 142, thereby applying a negative voltage across the base-emitter junction of output transistor 39. After lapse of a storage time delay interval caused by the presence of excess charge in the base region of horizontal output transistor 39, collector current for the output transistor is cut off, initiating the horizontal retrace interval. Driver transistor 43 conducts during the positive portion interval of deflection rate square-wave voltage 142, which encompasses the entire horizontal retrace interval and the beginning portions of the horizontal trace interval.

While driver transistor 43 is conducting, during the cutoff period of output transistor 39, energy is stored in driver transformer 44, as current flows from terminal 58 through driver transformer primary winding 44a. Driver transistor 43 becomes cutoff upon application of the negative-going edge of deflection rate square-wave voltage 142 to the base of the driver transistor. Current ceases to flow in primary winding 44a developing a positive voltage at the undotted terminal of secondary winding 44b. The positive voltage generates a forward base current in output transistor 39, turning on the output transistor into saturated conduction somewhat prior to the center of the horizontal trace interval. A sufficient amount of energy must be stored in driver transformer 44 during the conduction of driver transistor 43 to enable horizontal output transistor 39 to be operated in a saturated condition during the entirety of the subsequent conduction interval of the output transistor.

Horizontal oscillator 42 of the FIGURE may, for example, be fabricated as an integrated circuit and may directly apply the deflection rate square-wave voltage 142 to the base of driver transistor 43 without any intermediate buffer stages. Integrated circuits are typically designed to provide low output currents. Thus, an integrated circuit horizontal oscillator 42 may provide a relatively small amplitude forward drive base current to driver transistor 43. If a low beta transistor is used for horizontal driver 43, then a relatively high collector supply voltage $V_c$ must be developed at terminal 57 to enable driver transformer 44 to store, during the conduction of driver transistor 43, a sufficient amount of energy to properly drive horizontal output transistor 39. A limiting factor when selecting the magnitude of the voltage $V_c$ will be the reverse collector breakdown voltage rating of driver transistor 43. For the typical values illustrated in the FIGURE, a voltage of +90 volts DC is developed at terminal 58 and a voltage $V_c$ of +105 volts DC is developed at terminal 57 for an average load current $I_0$ of about 34 milliampere flowing through resistor 53.

Neglecting the current flowing from resistor 55, the current $I_0$ represents the average current flowing in primary winding 44a and in the collector of driver transistor 43. The average load current $I_0$ will be a function of the base drive requirements of the horizontal output transistor 39 and the construction of driver transformer 44. Resistor 55 provides the initial current in winding 44a during the start-up interval immediately following closure of ON/OFF switch 13 to enable deflection generator 34 to begin operating. During steady-state operation, after the voltage $V_c$ has been developed at terminal 57, most of the current requirement of winding 44a is provided from terminal 57.

The collector supply voltage $V_c$ is developed by a DC supply circuit 48 coupled between terminal 57 and secondary winding 28b of flyback transformer 28. Winding 28b is so polarized that the pulse voltage 128b across the winding develops at terminal 59 a positive retrace pulse voltage of amplitude $V_r$ during the horizontal retrace interval and a negative scan voltage of amplitude $V_s$ during the horizontal trace interval.

DC supply 48 comprises two capacitors 49 and 50 together with two rectifiers, diodes 51 and 52, arranged as a cascade rectifier of the Cockroft-Walton type. Capacitor 49 of the cascade rectifier supply 48 is thus series coupled with flyback transformer winding 28b, the electrode of capacitor 49 remote from terminal 59 being coupled to the junction of diodes 51 and 52 at a terminal 56.

During a first polarity interval of the alternating current pulse voltage 128b, that is, during the horizontal trace interval, diode 51 conducts and charges capacitor 49 to a first polarity voltage of magnitude $V_s$ such that terminal 59 is negative relative to terminal 56. During the opposite polarity interval of the alternating current pulse voltage 128b, that is, during the horizontal retrace interval, diode 51 is reverse biased and diode 52 becomes conductive. Capacitor 49 is discharged by the retrace pulse voltage and, depending upon the value of capacitor 49, may even become charged to the opposite polarity voltage such that terminal 59 is now positive relative to terminal 56.

Independent of any charge polarity reversal in capacitor 49 during the horizontal retrace interval, the sum of the voltages across capacitor 49 and capacitor 50 equals the retrace pulse voltage amplitude $V_r$. If the value of capacitor 50 is selected large enough, a well filtered DC voltage $V_c$ is established at terminal 57 for a given load current $I_0$ being drawn by driver transistor 43 and driver transformer 44.

In the equilibrium or steady-state condition, the charge removed each deflection cycle from capacitor 50 by the load current $I_0$ is replenished during each horizontal retrace interval when diode 52 is conductive and diode 51 is reverse biased. The replenishment charge for capacitor 50 is obtained from the discharge of capacitor 49 by the retrace pulse voltage of amplitude $V_r$ developed in winding 28b series coupled with capacitor 49. If capacitor 49 is selected to be of relatively small value, then the capacitor, in order to provide the replenishment charge, will discharge enough to reverse polarity and even develop an opposite polarity voltage of a magnitude that is a substantial fraction of the retrace pulse amplitude $V_r$.

Consider an example with circuit values as illustrated in the FIGURE, with a peak-to-peak amplitude of 200 volts for the pulse voltage 128b, a scan voltage $V_s$ of 20 volts magnitude, a retrace voltage $V_r$ of 180 volts magnitude and an average load current $I_0$ of 34 milliampere. The AC ripple voltage across the 4.7 microfarad capacitor 50 is less than 1 volt. During the horizontal trace interval, diode 51 conducts and charges capacitor 49 to a negative voltage of −20 volts equal in magnitude to the scan voltage $V_s$. With the size of capacitor 49 relatively small, equal to 0.022 microfarad in the FIGURE, capacitor 49 must be charged during the retrace interval to a positive voltage of approximately +75 volts in order to provide the replenishment charge to capacitor 50 that the 34 milliampere load current $I_0$ has removed during a complete deflection cycle. Under an equilibrium operating condition, therefore, the supply voltage $V_c$ developed across capacitor 50 approximately equals the difference between the +180 volt retrace pulse amplitude $V_r$ and the +75 volts developed across capacitor 49 during retrace, resulting in a supply voltage $V_c$ of +105 volts.

Because series coupled capacitor 49 is of relatively small value when compared to capacitor 50, approximately 200 times smaller in the example, and because capacitor 49 is of relatively small value when considering the amount of load current $I_0$ being drawn from output terminal 57, cascade rectifier supply 48, although providing a relatively well-filtered supply voltage $V_c$, provides relatively poor regulation against load current changes, as is desirable for reasons to be explained later. Should the average load current $I_0$ increase, for example, capacitor 49 must provide a greater replenishment charge to terminal 57 each deflection cycle. If capacitor 49 is of relatively small value, then this replenishment charge can only be provided if the positive voltage developed across the capacitor during retrace is substantially increased, as the negative voltage across the capacitor during trace is substantially fixed to the scan voltage $V_s$. Such an increase in positive voltage across capacitor 49 can only be provided when the supply voltage $V_c$ in equilibrium operation is significantly reduced due to the increased loading.

By using a relatively small valued capacitor for the series coupled capacitor 49, the cascade rectifier supply 48 acts as a voltage source having a relatively high series impedance to load current being drawn from output terminal 57, as exhibited by the decrease in output supply voltage $V_c$ with an increase in load current $I_0$. Furthermore, by using the high impedance cascade rectifier arrangement of the FIGURE as the DC supply 48, a collector supply voltage $V_c$ may be developed at terminal 57 that is significantly less in magnitude than the peak-to-peak voltage $V_{pp}$ developed by pulse voltage 128b. Had a conventional supply been used to provide the voltage $V_c$, such as a supply which rectifies the retrace voltage portion of the pulse voltage 128b, then the differences in voltage between the retrace pulse amplitude $V_r$ and the DC supply voltage $V_c$ would have been dropped across a series resistor, resulting in an undesirable power dissipation.

Poor regulation of the collector supply voltage $V_c$ for driver transistor 43 is desirable for several reasons. During picture tube arc-over, ultor terminal U and high voltage winding 28d is relatively heavily loaded, resulting in large load currents flowing in primary winding 28a and in the collector of horizontal output transistor 39. To limit the collector current in horizontal output transistor 39 during picture tube arc-over and thus limit the stress and possible damage to the transistor, it is desirable to limit the base drive of the transistor. For many harmonically tuned flyback transformers, especially third-harmonic tuned ones, the retrace pulse voltages in many of the windings of the flyback transformer increase during arc-over even though the high voltage winding is heavily loaded. Thus, the amplitude $V_r$ of the retrace pulse voltage developed across flyback transformer winding 28b increases during picture tube arc-over, tending to increase the supply voltage $V_c$. However, because DC supply 48 comprises a high impedance arrangement, the increased load current $I_0$ which flows from terminal 57 opposes the tendency of the increased retrace pulse amplitude to increase the supply voltage $V_c$. Thus, the cascade rectifier supply 48 limits the amount of load current $I_0$ that can be drawn by driver transistor 43 and driver transformer 44, thereby limiting the base drive of the horizontal output transistor 39 under picture tube arc-over.

More color television receivers provide for the disabling of the horizontal deflection generator and driver circuit should the high voltage developed at ultor terminal U increase beyond acceptable values. As illustrated in the FIGURE, a retrace pulse voltage 128e developed across a flyback transformer winding 28e is applied at a terminal A to a disabling latch circuit 47. If the amplitude of the retrace pulse voltage 128e exceeds permissible limits, the disabling latch is energized and provides a forward base current to driver transistor 43 to continuously maintain the transistor in conduction while the latch is energized. Because driver transistor 43 is continuously conducting, horizontal output transistor 39 cannot perform its switching function but is maintained continuously in the off-state, thereby preventing any voltage from being developed at ultor terminal U. High impedance cascade rectifier supply 48 limits the stress on driver transistor 43 when disabling latch 47 is energized by limiting the maximum load current $I_0$ that can flow during the continuous conduction of driver transistor 43.

Deflection rate square-wave voltage 142, after being inverted by driver transistor 43, is AC coupled to the base of horizontal output transistor 39 through driver transformer 44. Duty cycle variations of the deflection rate square-wave voltage 142 will result in peak-to-peak variations in the square-wave base drive voltage developed across driver transformer secondary winding 44b. The base drive to the horizontal output transistor 39 will thus undesirably vary.

For a horizontal oscillator circuit 42 with a fixed duty cycle mode of operation, tight tolerance of the duty cycle of square-wave voltage 142 is typically maintained by using precision components at critical locations within the horizontal oscillator circuit. Using the rectifier supply of the FIGURE, a relatively tight tolerance to the duty cycle of square-wave voltage 142 is no longer required, minimizing the need for relatively costly precision components within horizontal oscillator 42. For example, should the on-time of horizontal driver transistor 43 decrease, the on-time of horizontal output transistor 39 will increase. For an AC coupled output transistor base drive voltage, an increase in the on-time of the output transistor results in a decreased positive base voltage across winding 44b. However, because the on-time of driver transistor 43 has decreased, the load current $I_0$ also tends to decrease. The DC supply voltage $V_c$ thus tends to increase in a compensatory manner. For similar reasons, a high impedance cascade rectifier supply is advantageous to use when the duty cycle of the horizontal oscillator output is modulated to provide B+ operating voltage regulation, as in a Wessel-like regulator and deflection circuit.

Horizontal oscillator circuits fabricated as an integrated circuit typically require a relatively large driver transistor collector supply voltage of 60 volts DC or greater. This requirement, together with the requirement of relatively poor load regulation or high source impedance, imposes the restriction of using a relatively large retrace pulse voltage such as +180 volts for the retrace pulse developed across flyback transformer winding 28b of the FIGURE. The cascade rectifier arrangement of the FIGURE satisfies the restraints imposed on a collector supply for a driver transistor in an economical and in a relatively dissipationless manner.

By way of another example, resistor 53 and capacitor 54 of the FIGURE are omitted and terminal 57 is directly connected to terminal 58. To obtain a collector supply voltage $V_c$ of 60 volts DC at terminal 57 with a load current $I_0$ of 29 milliampere flowing from terminal 57 to driver transformer winding 44a, the value of the series capacitor 49 is selected as 0.01 microfarad. To provide at least the minimum necessary filtering of the voltage $V_c$, the value of capacitor 50 is selected at 0.1 microfarad. The value of series capacitor 49 is sufficiently small at the given load current level of 29 milliampere to provide for a significantly reduced voltage $V_c$ of 60 volts even though the retrace pulse voltage is substantially larger, around 180 volts. Series capacitor 49 is of sufficiently small value, unlike one in a conventional voltage doubler circuit, that after it becomes charged by the trace voltage to a first polarity voltage $V_s$, it becomes discharged by the retrace voltage $V_r$ and recharged to the opposite polarity voltage of $V_r - V_c$.

What is claimed is:

1. A deflection generator and driver circuit, comprising:
   a deflection winding;
   trace switching means responsive to a deflection rate switching signal for generating scanning current in said deflection winding;
   a driver stage responsive to a deflection rate control signal for developing said deflection rate switching signal;
   means coupled to said driver stage for applying said deflection rate switching signal to said trace switching means to control the conduction of said trace switching means;
   a source of deflection rate alternating current voltage developing a first polarity pulse voltage during a retrace interval of each deflection cycle and an opposite polarity trace voltage during a trace interval of each deflection cycle; and
   DC supply means coupled to said source and to said driver stage for providing a load current to said driver stage at an output terminal of said DC supply means, including
   a first capacitor series coupled with said source;
   a first rectifier coupled to said first capacitor for charging said first capacitor from said trace voltage during said trace interval;
   a second capacitor coupled to said output terminal, and
   a second rectifier coupled to said source and to said second capacitor for applying during said retrace interval the trace interval voltage developed across said first capacitor in series with said pulse voltage to develop a direct current supply across said second capacitor, said pulse voltage charging said first capacitor during said retrace interval to a voltage polarity opposite that established across said first capacitor during said trace interval and to a voltage magnitude that develops a direct current supply voltage that is of a substantially lesser magnitude than that of said pulse voltage.

2. A circuit according to claim 1 wherein said first capacitor is of lesser value than the value of said second capacitor.

3. A circuit according to claim 1 including a flyback transformer, said trace switching means including an output transistor, a first winding of said flyback transformer being coupled to said output transistor, a high voltage winding of said flyback transformer being coupled to an ultor load circuit and a secondary winding of said flyback transformer comprising said source of deflection rate alternating current voltage.

4. A circuit according to claim 3 wherein said deflection rate switching signal producing means comprises a driver transformer with a first winding coupled to a collector circuit of said driver stage and a second winding coupled to the base circuit of said output transistor.

5. A circuit according to claim 4 including an oscillator for developing said deflection rate control signal, said oscillator providing pulse width modulation of said control signal.

6. A circuit according to claim 4 including a disabling circuit coupled to said driver stage and capable of maintaining said driver stage conductive for a period that disables normal deflection generator and driver circuit operation.

* * * * *